(12) United States Patent
Bakker et al.

(10) Patent No.: US 9,414,272 B2
(45) Date of Patent: *Aug. 9, 2016

(54) UE MEASUREMENTS FOR HOT SPOT DETECTION

(71) Applicant: Nokia Technologies Oy, Espoo (FI)

(72) Inventors: Hajo-Erich Bakker, Eberdingen (DE); Anton Ambrosy, Tiefenbronn (DE)

(73) Assignee: Nokia Technologies Oy, Espoo (FI)

( * ) Notice: Subject to any disclaimer, the term of this patent is extended or adjusted under 35 U.S.C. 154(b) by 20 days.

This patent is subject to a terminal disclaimer.

(21) Appl. No.: 14/634,047

(22) Filed: Feb. 27, 2015

(65) Prior Publication Data

US 2015/0172952 A1    Jun. 18, 2015

Related U.S. Application Data

(63) Continuation of application No. 13/391,029, filed as application No. PCT/EP2010/006166 on Aug. 11, 2010, now Pat. No. 9,008,719.

(30) Foreign Application Priority Data

Aug. 18, 2009 (EP) ..................................... 09290630

(51) Int. Cl.
   *H04B 7/00*      (2006.01)
   *H04W 36/00*     (2009.01)

(52) U.S. Cl.
   CPC ................................. *H04W 36/0055* (2013.01)

(58) Field of Classification Search
   CPC ..... H04W 88/08; H04W 92/20; H04W 36/08;
            H04W 48/20; H04W 84/045; H04W 36/14;
            H04W 48/10; H04W 4/02; H04W 36/0061;
            H04W 36/04; H04W 36/06; H04W 72/0426;
            H04W 88/12; H04W 92/12; H04W 28/18;
            H04W 36/0022; H04W 36/0066

USPC ........................ 455/436–444; 370/230.1, 236
See application file for complete search history.

(56) References Cited

U.S. PATENT DOCUMENTS 7,376,424 B2 * 5/2008 Kim et al. ..................... 455/436
7,542,766 B2 * 6/2009 Kobayashi et al. ........... 455/440

(Continued)

FOREIGN PATENT DOCUMENTS

| CN | 1984485 A | 6/2007 |
| EP | 1 773 009 A2 | 4/2007 |

(Continued)

*Primary Examiner* — Edward Urban
*Assistant Examiner* — Max Mathew
(74) *Attorney, Agent, or Firm* — Harrington & Smith

(57) ABSTRACT

The present invention relates to a method for acquiring radio measurements in a mobile communication system. In accordance with one embodiment of the invention, the method comprises the steps of. —within a serving cell (A) operated by a radio access node (eNBA) and serving a particular user equipment (UEX), sending measurement control information (meas_ctrl_info) from the radio access node to the particular user equipment whereby the particular user equipment is configured to perform radio measurements, —within a further serving cell (B) operated by a further radio access node (eNBB) and subsequently serving the particular user equipment, sending a measurement report (meas_report) from the particular user equipment to the further radio access node comprising measurement data (meas_data) as configured by the serving cell and a cell identifier (PCIA) of the serving cell, —transferring the measurement data from the further radio access node back to the radio access node. The present invention also relates to a user equipment and to a radio access node operable to form part of a mobile communication system.

20 Claims, 4 Drawing Sheets

(56) References Cited

U.S. PATENT DOCUMENTS

| | | | |
|---|---|---|---|
| 8,274,950 B2 | 9/2012 | Lee et al. | |
| 8,358,629 B2 | 1/2013 | Grilli et al. | |
| 8,699,455 B2 * | 4/2014 | Wager | H04W 36/0055 370/329 |
| 9,031,564 B2 * | 5/2015 | Teyeb | H04W 36/0083 455/422.1 |
| 2006/0270408 A1 | 11/2006 | Kobayashi et al. | |
| 2011/0134882 A1 | 6/2011 | Aoyama et al. | |
| 2014/0256321 A1 * | 9/2014 | Aghili | 455/435.1 |

FOREIGN PATENT DOCUMENTS

| | | |
|---|---|---|
| EP | 1 835 773 A1 | 9/2007 |
| EP | 1 881 720 A1 | 1/2008 |
| JP | 2009-177762 | 8/2009 |
| WO | WO 00/67507 | 11/2000 |
| WO | WO 2009/084146 A1 | 7/2009 |

* cited by examiner

UE MEASUREMENTS FOR HOT SPOT DETECTION

This application is a Continuation of and claims priority to and the benefit of U.S. application Ser. No. 13/391,029, filed Feb. 17, 2012, by Hajo-Erich Bakker, et al., entitled: UE MEASUREMENTS FOR HOT SPOT DETECTION, which is a U.S. National Stage entry of International Application No. PCT/EP2010/061662 (International Filing Date of Aug. 11, 2010), which claims priority to European Patent Application No. 09290630.4, which was fled Aug. 18, 2009, which issued as European Patent No. 2288201 B1 on Oct. 3, 2012. The entirety of U.S. application Ser. No. 13/391,029, International Application No. PCT/EP2010/006166 and European Patent Application No. 09290630.4 are incorporated herein by reference.

FIELD OF THE INVENTION

The present invention relates to a method for acquiring radio measurements in a mobile communication system.

BACKGROUND OF THE INVENTION

In $3^{rd}$ Generation Partnership Project (3GPP) Long Term Evolution (LTE) mobile networks, there exist often unwanted small coverage islands (e.g., overshootings from neighboring cells), so called "hot spots", which offer a very-confined lower path loss within the coverage of another (surrounding) cell due to topological peculiarities. A User Equipment (UE), which is moving towards a hot spot, is ordered by the serving cell to execute an handover towards that hot spot when the required handover conditions are fulfilled and the configured handover event is reported by the UE.

An handover requires a significant amount of signalling between Evolved Universal Terrestrial Radio Access Network (E-UTRAN) NodeBs (eNBs) over the X2 or S1 interface, and between UEs and eNBs over the air interface. Handovers towards unwanted hot spots should be avoided if the available signal quality of the current serving cell is still good enough within the hot spot area, that is to say the requested service(s) can still be supported by the current serving cell even if the hot spot offers a better radio quality.

Handover and radio link failure rates shall be minimised by self-optimisation of handover parameters or by avoidance of handovers towards inappropriate cells.

It is the task for an efficient mobile network like LTE to analyze handovers towards hot spots and to block unnecessary handovers. In current wireless systems like 3GPP UMTS, 3GPP2 CDMA2000, or IEEE 802.16 (WIMAX) networks, this is achieved via costly drive tests. In LTE, this shall be carried out automatically by means of Self-Organizing Networks (SON).

3GPP Radio Access Network (RAN) Working Group 2 (WG2) is currently investigating UE measurements for drive test minimisation. These measurements will be sent to eNBs and/or to operation and maintenance centres (O&M) for further processing. Self-optimisation of handover parameters is currently under discussion in 3GPP RAN WG3, which can be based inter alia on reported UE measurements.

SUMMARY OF THE INVENTION

It is an object of the present invention to enhance the acquisition of UE measurements so as to avoid unnecessary handovers towards hot spots.

In accordance with a first aspect of the invention, a method for acquiring radio measurements in a mobile communication system comprises the steps of:
within a serving cell operated by a radio access node and serving a particular user equipment, sending measurement control information from said radio access node to said particular user equipment whereby said particular user equipment is configured to perform radio measurements,
within a further serving cell operated by a further radio access node and subsequently serving said particular user equipment, sending a measurement report from said particular user equipment to said further radio access node comprising measurement data as configured by said serving cell and a cell identifier of said serving cell,
transferring said measurement data from said further radio access node back to said radio access node.

Within a first serving cell operated by a first eNB, and further referred to as the measurement-triggering cell, a particular UE is configured to carry out radio measurements for some period of time. When that period of time elapses, the UE reports the measurement data towards the current serving cell, which can be another cell operated by the same eNB or another eNB if the serving cell has changed meanwhile, and which is further referred to as the measurement-reporting cell. The UE further encodes the cell identifier of the measurement-triggering cell into the measurement report so as to allow the eNB operating the measurement-reporting cell to transfer the measurement data back to the eNB operating the measurement-triggering cell.

A serving cell is thus made aware about the outcome of a particular communication session for which an handover decision towards a particular target cell was made. Those measurement data, which are being acquired while the UE is switching from one cell to another, and which are kept in the UE memory past the different serving cells, are particularly helpful for further handover decisions towards that particular target cell.

The measurement-triggering cell can be a first serving cell, and the measurement-reporting cell can be a hot spot cell within that first serving cell. Alternatively, the measurement-triggering cell can be a hot spot cell, and the measurement-reporting cell can be a further serving cell. Still alternatively, the measurement-triggering cell can be a first serving cell, and the measurement-reporting cell can be a further serving cell, the hot spot cell being an intermediary serving cell in between.

The measurement-triggering cell and the measurement-reporting cell may use different types of radio access technology, e.g. the measurement-triggering cell in LTE and the measurement-reporting cell in UMTS, or vice-versa.

The cell identifier identifies a particular cell, and further a particular eNB operating that particular cell, within a network domain.

In one embodiment, said cell identifier comprises a Physical Cell Identifier (PCI) of said serving cell.

This embodiment is particularly advantageous when measurement data are exchanged over the X2 interface.

In an alternative embodiment, said cell identifier comprises a Global Cell Identifier (GCI) of said serving cell and a Tracking Area Identifier (TAI) of said serving cell.

The GCI is constructed from the Private Land Mobile Network (PLMN) identity the cell belongs to and a further cell identifier of the cell. This embodiment is particularly advantageous when measurement data are exchanged over the S1 interface.

In one embodiment, said serving cell serves said particular user equipment with a particular mobile communication service, and said further serving cell takes over said particular communication service with said particular user equipment.

The particular communication service may refer for instance to a voice, video or data communication session. The taking over of the particular communication service by the further serving cell may refer to a handover procedure, which further serving cell being a target cell, or to a service resumption procedure after a radio link failure, which further serving cell being an additional target cell prepared for service resumption.

Alternatively, the UE may be unable to resume the particular communication service, for instance after a radio link failure without any cell being prepared for service resumption. A new communication session is then to be set up for purposely reporting the configured measurement data.

In one embodiment, the method further comprises the steps of, within said serving cell:
 detecting an handover condition towards a target cell being fulfilled for said particular user equipment,
 identifying said target cell as a possible hot spot,
 sending said measurement control information thereupon.

The radio measurements can be triggered for a particular UE when an handover decision towards a cell, which has been identified as a potential hot spot, was made for that particular UE, thereby restricting the radio measurements to targeted UEs only and greatly reducing the induced signaling load.

Alternatively, the radio measurements can be configured by default for all UEs entering or leaving the serving cell, or can be configured when further criteria are met, e.g. for specific geographical areas based upon reported UE location information and/or computed timing advance values.

In one embodiment, said measurement data are organized as time records.

Accordingly, one can track the UE radio environment over the time while the UE is traversing the hot spot area.

The time-granularity of the measurement records can be supplied within the measurement control information.

In one embodiment, said measurement control information comprises a reporting time period, and said measurement report is sent upon expiry of said reporting time period.

The period of time after which the measurement report is to be sent is supplied within the measurement control information.

The UE may not wait for that period of time to elapse before reporting the measurement data. For instance, a UE fails to resume the current communication session after a radio link failure, establishes a new communication session with another cell, and sends the measurement report at once.

In one embodiment, the method further comprises the step of using said measurement data for self-tuning an handover decision algorithm.

The measurement data, which is transferred back to the radio access node operating the measurement-triggering cell, is used by this access node or by a further access node for optimizing the handover decisions towards the hot spot cell, for instance by blacklisting the hot spot cell, or by self-adjusting suitable handover parameters towards the hot spot cell, such as the handover margin and/or how long the new cell has to be detected better than the current serving cell.

In one embodiment, said measurement data comprise signal strengths of a current serving cell and of one or more neighboring cells.

An example of signal strength is the receive signal power or receive signal amplitude.

In one embodiment, said measurement data comprise signal qualities of a current serving cell and of one or more neighboring cells.

An example of signal quality is the receive bit error rate.

The present invention also relates to a user equipment operable to form part of a mobile communication system.

In accordance with a further aspect of the invention, the user equipment is adapted:
 within a serving cell operated by a radio access node, to receive measurement control information from said radio access node whereby said user equipment is configured to perform radio measurements,
 within a further serving cell operated by a further radio access node, to send a measurement report to said further radio access node comprising measurement data as configured by said serving cell and a cell identifier of said serving cell.

The present invention also relates to a radio access node operable to form part of a mobile communication system.

In accordance with a further aspect of the invention, the radio access node is adapted:
 to operate a serving cell serving a particular user equipment,
 to receive a measurement report from said particular user equipment comprising measurement data as configured by a further serving cell and a cell identifier of said further serving cell,
 to transfer said measurement data from said radio access node back to a further radio access node operating said further serving cell.

Embodiments of a user equipment according to the invention and embodiments of a radio access node according to the invention correspond with the embodiments of a method according to the invention.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF THE INVENTION

Figure 1A:
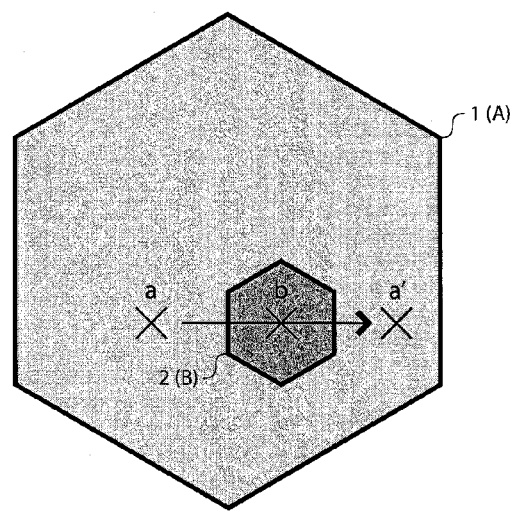
FIGS. 1A and 1B represent a first and second use case of radio coverage featuring a hot spot area.

There is seen in FIG. 1A a first use case representing a hot spot area 2 within a larger surrounding cell 1 (or A). The hot spot area 2 is caused by the radio signal of another cell B overshooting within the radio coverage of cell A.

A mobile terminal UEX goes through the hot spot area 2, and moves from position a to position a' through position b. At positions a and a', the radio signal from cell A incurs a lower path loss than the radio signal from cell B. At position b, the radio signal from cell B incurs a lower path loss than the radio signal from cell A. Provided the difference between the respective path losses is beyond some configured handover margin, the mobile terminal UEX is likely to hand over from cell A to cell B, and very soon after from cell B back to cell A.

It is an object of the invention to prevent the mobile terminal UEX from switching to cell B while the coverage within the initial serving cell A is still good enough to achieve the required throughput and Quality of Service (QoS) for the current traffic session.

Figure 1B:
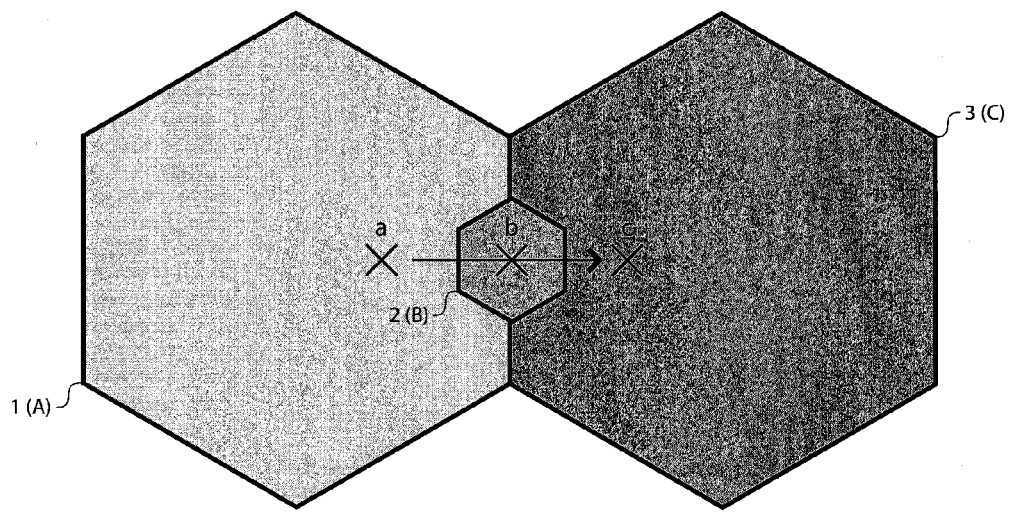

There is seen in FIG. 1B a second use case representing a hot spot area 2 caused by the radio signal of a cell B overshooting at the border of a first cell A and a second cell C.

A mobile terminal UEX goes through the hot spot area 2, and moves from position a to position c through position b. At positions a, the radio signal from cell A incurs a lower path loss than the radio signals from cells B and C. At position b, the radio signal from cell B incurs a lower path loss than the radio signals from cells A and C. At position c, the radio signal from cell C incurs a lower path loss than the radio signals from cells A and B. Provided the difference between the respective path losses is beyond some configured handover margin, the mobile terminal UEX is likely to be handed over from cell A to cell B, and very soon after from cell B to cell C.

It is a further object of the invention to redirect the mobile terminal UEX directly to cell C without going through the intermediary cell B. This is possible if the signal path loss from either cell A or B is low enough within the hot spot area 2 to achieve the required throughput and QoS for the current traffic session.

Both objectives are achieved by triggering cell-persistent radio measurements while the mobile terminal UEX is traversing a hot spot area, and by using those measurement data for refining further handover decisions towards hot spot cells.

Figure 2:
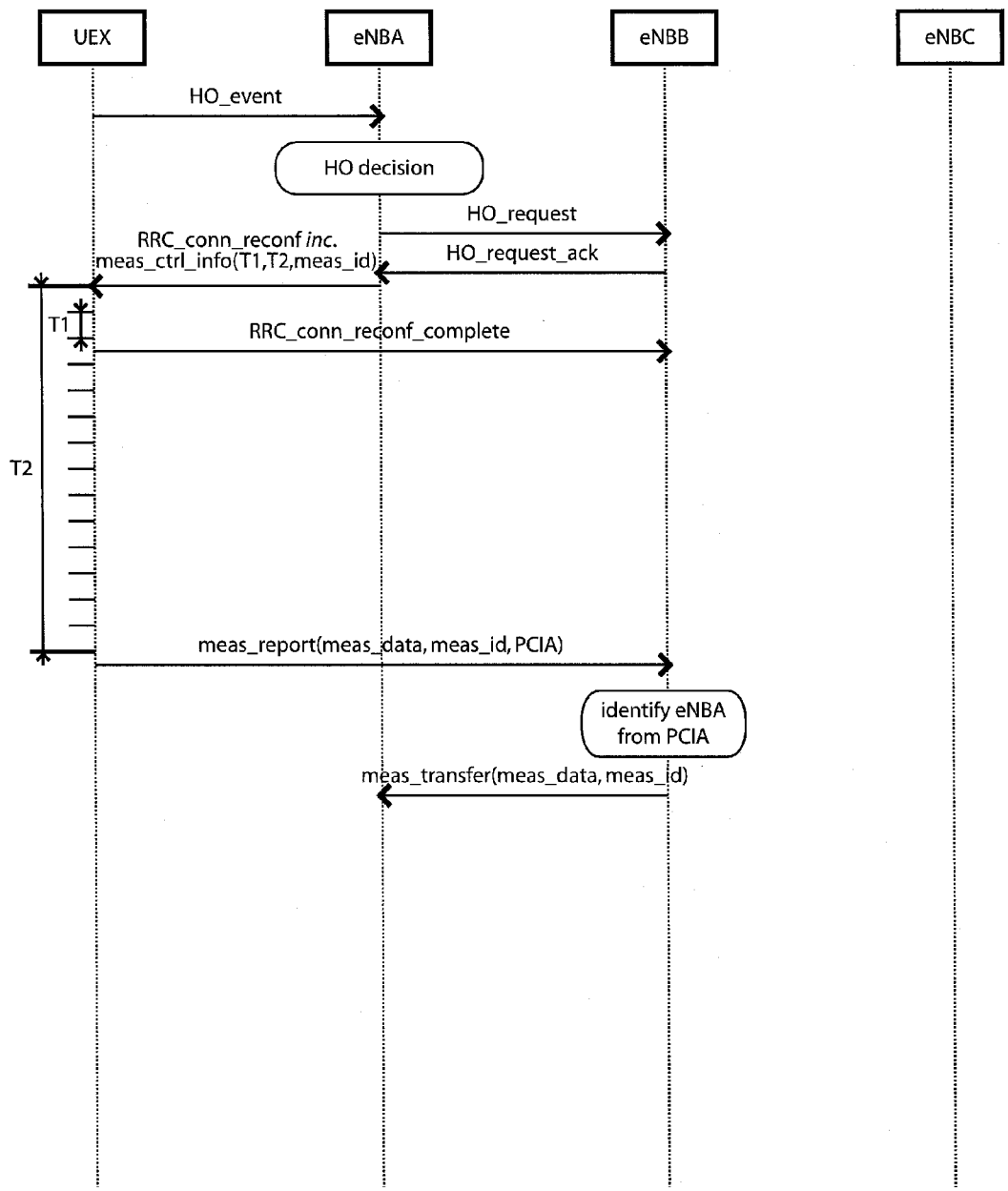
FIG. 2 represents a first message flow chart for measurement reporting.

There is seen in FIG. 2 a message flow chart between the mobile terminal UEX and eNBs eNBA, eNBB and eNBC operating cells A, B and C respectively. Although cells are shown as being operated by distinct eNBs, it is to be noticed that two or more cells, such as cells A and C, can be operated by the same eNB.

At some point in time, the mobile terminal UEX, which is being served by cell A, and which is moving from position a to position b, reports an handover event HO_event to the serving cell A indicating a stronger signal from cell B (above some margin). Thereupon, the source eNB eNBA makes a decision to hand off the mobile terminal UEX towards cell B.

The source eNB eNBA issues a message HO_request to the target eNB eNBB passing necessary information to prepare the handover at the target side.

After admission control, the target eNB eNBB answers with an acknowledgement HO_request_ack comprising UE data for performing an handover towards the target cell B.

The source eNB eNBA commands the mobile terminal UEX to perform an handover towards the target cell B by generating a message RRC_conn_reconf.

After receiving the message RRC_conn_reconf, the mobile terminal UEX performs synchronization to the target eNB eNBB, and accesses the target cell B via Random Access Channel (RACH), following a contention-free procedure or contention-based procedure. The target eNB eNBB responds with uplink channel allocation and timing advance value. The mobile terminal UEX sends a message RRC_conn_reconf complete to the target eNB eNBB to confirm the handover.

The handover procedure keeps on with the serving gateway switching the user traffic plane from the source eNB eNBA towards the target eNB eNBB.

The message RRC_conn_reconf further includes measurement control information meas_ctrl_info, whereby the mobile terminal UEX is configured to perform cell-persistent radio measurements. The measurement control information comprises a measurement identifier meas_id, and two time periods T1 and T2.

The measurement identifier allows the association between measurement data and a particular UE that was configured to perform those measurements.

The time period T1 denotes the periodicity at which radio measurements shall be performed, and the time period T2 denotes the reporting period upon which the UE shall report the acquired measurement data to the current serving cell.

Alternatively, the measurement control information meas_ctrl_info can be sent apart via a dedicated message.

The mobile terminal UEX starts the measurement period T2 upon receipt of the measurement control information meas_ctrl_info from the eNB eNBA. The mobile terminal UEX first stores the PCI of the measurement-triggering cell, presently PCIA. The mobile terminal UEX measures the signal strength of inter alia cells A, B and C while being served by cell A and next cell B, stores the radio measurements performed during the last T1 period in a measurement history (possibly after averaging and/or further data processing), and reiterates until the period T2 expires, thereby yielding measurement data meas_data.

An exemplary value for T1 is 200 ms, and an exemplary value for T2 is 2 seconds, that is to say the measurement data meas_data comprises 10 measurements records, one for each 200 ms period.

Upon expiry of the timer T2, the UEX builds up a measurement report meas_report comprising the compiled measurement data meas_data, the measurement identifier meas_id and the cell identifier PCIA of the measurement-triggering cell. The measurement report meas_report is then sent to the eNB operating the current serving cell, presently eNBB.

The eNB eNBB identifies the eNB eNBA as operating the cell identified by the cell identifier PCIA. More specifically, the eNB eNBB derives a tunnel end-point identifier connecting to the eNB eNBA through the X2 interface from the cell identifier PCIA (the association between a particular PCI and a particular tunnel end-point identifier are acquired during the eNB discovery phase), and transfers the measurement data meas_data and the measurement identifier meas_id through the so-identified tunnel towards the eNB eNBA (see message meas_transfer in FIG. 2).

The eNB eNBA is thus aware about the outcome of the handover decision that was made for the mobile terminal UEX. For instance, the eNB eNBA notices that the signal strength from cell A is still good enough after the handover was made, and therefore may decide to keep further mobile terminals within the coverage of cell A when similar handover criteria are met.

An indication may be sent to the target cell for informing the target cell that cell-persistent radio measurements are on-going. This indication can be sent as part of the message HO_request, or the target cell can be informed by the UE itself during connection establishment with the target cell. The UE shall accept new measurement control information as configured by the target cell (e.g., for the different handover events) in addition to the on-going cell-persistent radio measurements as configured by the measurement-triggering cell.

Figure 3:
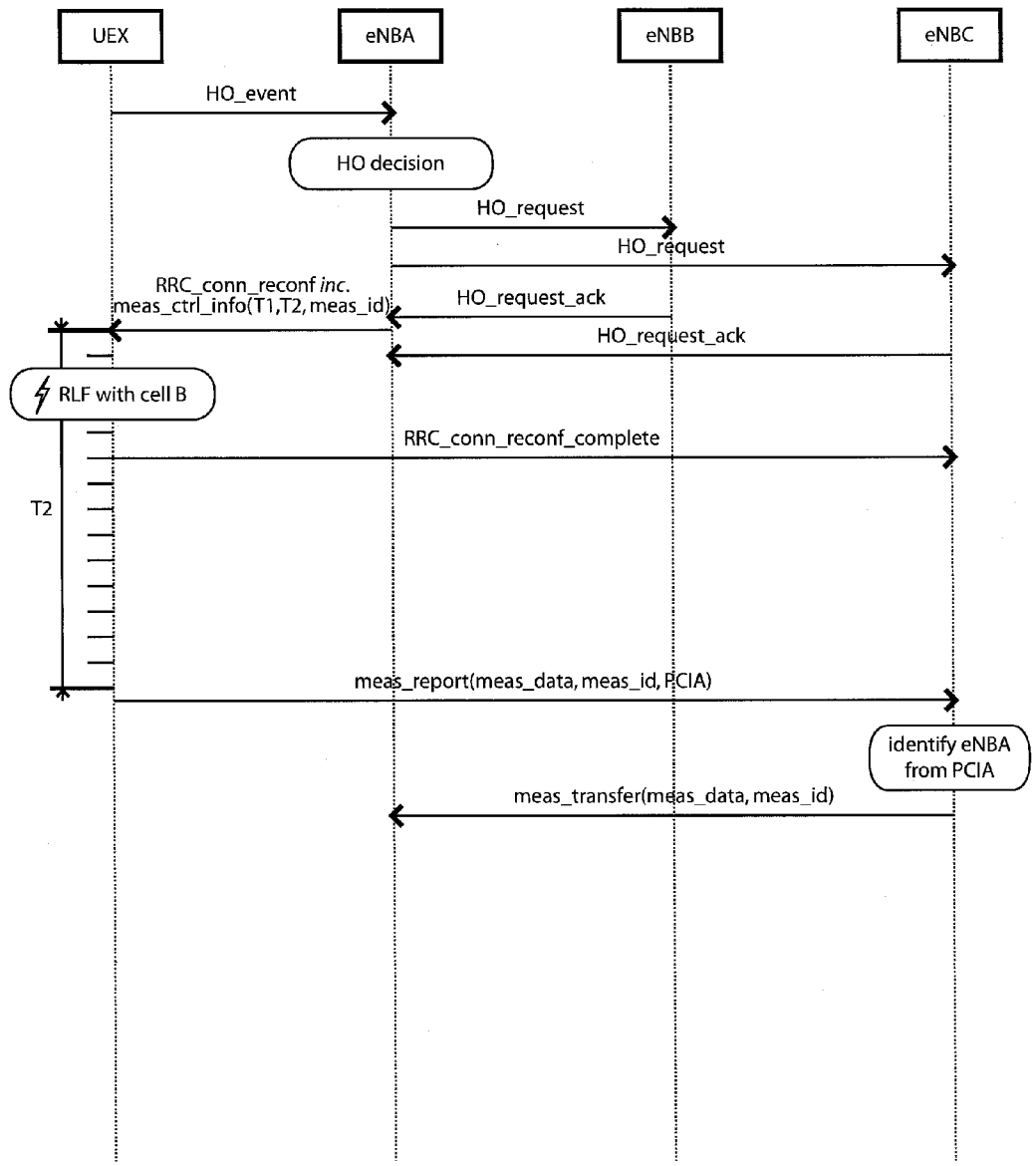
FIG. 3 represents a second message flow chart for measurement reporting.

There is seen in FIG. 3 an alternative scenario wherein the mobile terminal UEX detects a radio link failure, and thus is unable to connect to the target cell B. This scenario is rather plausible since there may be a very-confined hot spot within cell A, and the signal strength from cell B may drop suddenly if the mobile terminal UEX is moving fast.

In this scenario, an additional target cell, presently cell C operated by eNB eNBC, has been prepared for service resumption, if any (see additional HO_request and HO_request_ack messages between eNBA and eNBC in FIG. 3).

The mobile terminal UEX tries to resume the communication session with cell C, and sends the message RRC_conn_reconf complete to the eNB eNBC.

Again, upon expiry of the reporting period T2, the mobile terminal UEX reports the measurement data meas_data, the measurement identifier meas_id and the cell identifier PCIA of the measurement-triggering cell to the eNB operating the current serving cell, presently eNBC.

The eNB eNBC identifies the eNB eNBA as operating the cell identified by the cell identifier PCIA, and transfers the measurement data meas_data and the measurement identifier meas_id to the eNB eNBA (see message meas transfer between eNBC and eNBA in FIG. 3).

Figure 4:
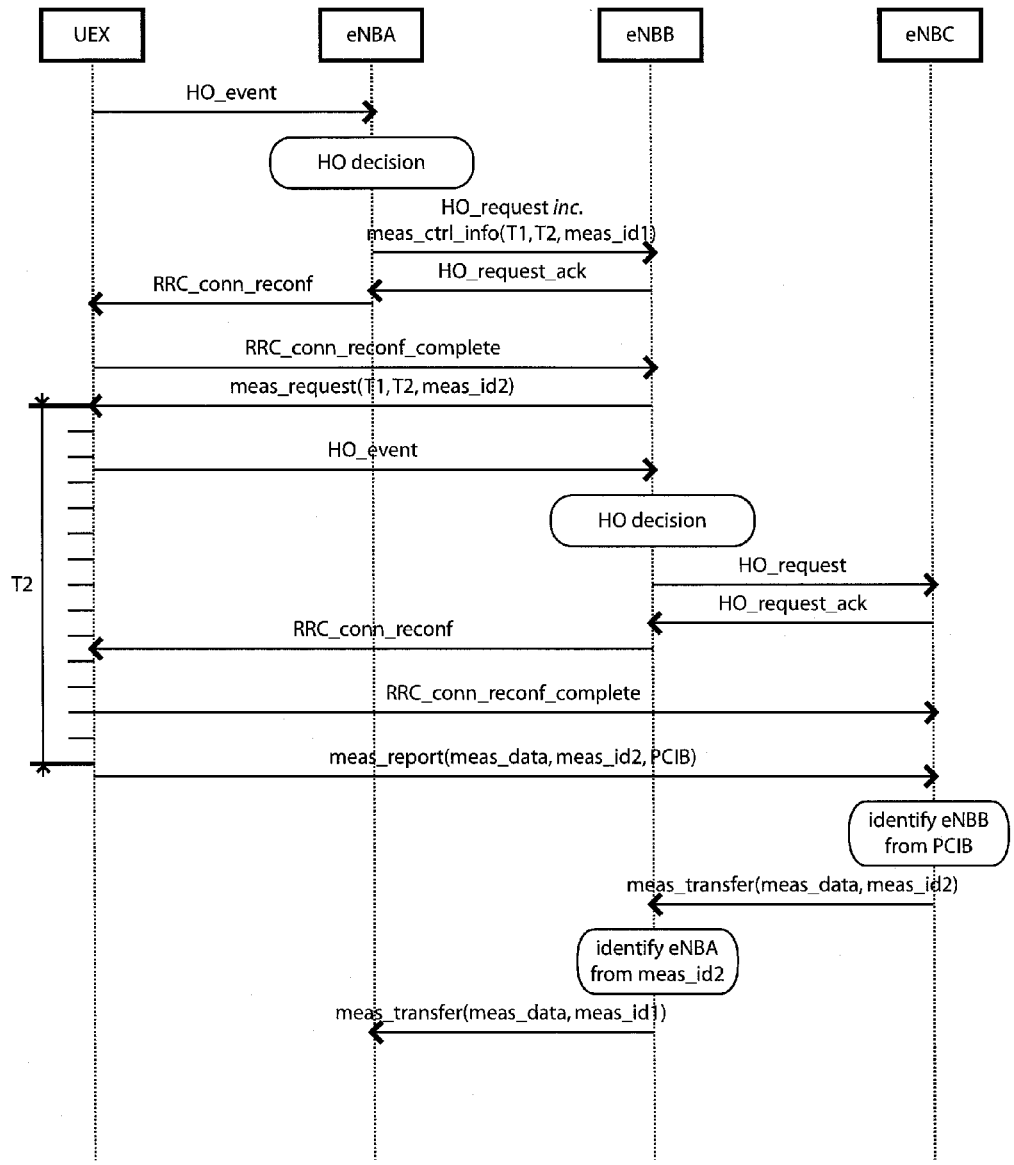
FIG. 4 represents a third message flow chart for measurement reporting.

There is seen in FIG. 4 still an alternative scenario, wherein the serving cell, presently cell A, passes measurement control information meas_ctrl_info to the hot spot cell, presently cell B, for it to trigger radio measurements when the mobile terminal UEX connects to cell B. The measurement control information meas_ctrl_info are sent as part of the message HO_request, yet they can be sent apart as a dedicated message.

The measurement control information meas_ctrl_info comprises the time periods T1 and T2, as well as a measurement identifier meas_id1. The eNB eNBB stores the association between the eNB eNBA, the measurement identifier meas_id1, and a further measurement identifier meas_id2 to be used for triggering the radio measurements.

Upon receipt of the message RRC_conn_reconf_complete from the mobile terminal UEX, the eNB eNBB sends a message meas_request comprising the time periods T1 and T2, and the further message identifier meas_id2.

The mobile terminal UEX stores the PCI of the measurement-triggering cell, presently PCIB. After some while, the mobile terminal UEX hands over towards cell C. The mobile terminal UEX measures the signal strength of inter alia cells A, B and C while being served by cell B and next cell C.

Upon expiry of the reporting period T2, the mobile terminal UEX reports the measurement data meas_data, the measurement identifier meas_id2, and the cell identifier PCIB of the measurement-triggering cell to the eNB operating the current serving cell, presently eNBC.

The eNB eNBC identifies the eNB eNBB as operating the cell identified by the cell identifier PCIB, and transfers the measurement data meas_data and the measurement identifier meas_id2 to the eNB eNBB (see message meas_transfer between eNBC and eNBB in FIG. 4).

The eNB eNBB identifies the eNB eNBA from the measurement identifier meas_id2 and the stored association, retrieves the initial measurement identifier meas_id1, and transfers the measurement data meas_data and the measurement identifier meas_id1 to the eNB eNBA (see message meas_transfer between eNBB and eNBA in FIG. 4), thereby allowing the eNB eNBA to link those measurement data with a particular handover decision.

The measurement-triggering cell may include its GCI and TAI in the measurement control information meas_ctrl_info. The UE may supply to the measurement-reporting cell the GCI and TAI of the measurement-triggering cell in lieu of, or in addition to, the PCI of the measurement-triggering cell, thereby allowing the measurement-reporting cell to transfer the measurement data meas_data through the S1 interface to the measurement-triggering cell.

Although the embodiments have been described with exhaustive references to LTE technology and wording, it should be clear that the present invention applies similarly to further mobile technologies such as 3GPP UMTS, 3GPP2 CDMA2000, or IEEE 802.16 (WIMAX) technologies.

It is to be noticed that the term 'comprising', also used in the claims, should not be interpreted as being restricted to the means listed thereafter. Thus, the scope of the expression 'a device comprising means A and B' should not be limited to devices consisting only of components A and B. It means that with respect to the present invention, the relevant components of the device are A and B.

It is to be further noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B, and/or vice-versa. It means that there exists a path between an output of A and an input of B, and/or vice-versa, which may be a path including other devices or means.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, a processor should not be construed to refer exclusively to hardware capable of executing software, and may implicitly include, without limitation, digital signal processor (DSP) hardware, network processor, application specific integrated circuit (ASIC), field programmable gate array (FPGA), etc. Other hardware, conventional and/or custom, such as read only memory (ROM), random access memory (RAM), and non-volatile storage, may also be included.

We claim:
1. A user equipment for supporting report of radio measurement information in a radio access network, the user equipment comprising at least one processor configured to:
 establish a connection to a first radio access node operating a first serving cell,
 receive a radio measurement configuration from said first radio access node,
 store measurement data related to a radio measurement performed in accordance with said radio measurement configuration,
 detect a radio link failure or handover failure,
 resume or establish a connection to a second radio access node operating a second serving cell, and
 provide said stored measurement data and cell identifier information of said first serving cell towards said second radio access node.

2. The user equipment according to claim 1, wherein said at least one processor is configured to:
perform said radio measurement while said user equipment is switching from said first serving cell to the second serving cell or a third cell.

3. The user equipment according to claim 1, wherein said at least one processor is configured to:
perform said radio measurement while said user equipment is being served by said first serving cell.

4. The user equipment according to claim 1, wherein said at least one processor is configured to:
build up a report comprising compiled said measurement data and said cell identifier information of said first serving cell, and
send said report towards said second radio access node.

5. The user equipment according to claim 1, wherein said at least one processor is configured to:
provide said cell identifier information of said first serving cell towards said second radio access node so as to allow said second radio access node to transfer said stored measurement data to said first radio access node.

6. The user equipment according to claim 1, wherein said second radio access node is different from said first radio access node, or the same.

7. The user equipment according to claim 1, wherein said second serving cell is different from said first serving cell, or the same.

8. The user equipment according to claim 1, wherein said stored measurement data is provided dependent on a condition.

9. The user equipment according to claim 8, wherein said condition refers to the expiry of a reporting or time period, or a timer.

10. The user equipment according to claim 1, wherein said cell identifier information comprises a global cell identifier of said first serving cell.

11. The user equipment according to claim 1, wherein said cell identifier information comprises a physical cell identifier of said first serving cell.

12. The user equipment according to claim 1, wherein said at least one processor is further configured to:
provide location information towards said second radio access node.

13. The user equipment according to claim 1, wherein in case of handover failure from a source cell to a target cell said at least one processor is configured to:
provide cell identifier information of said source cell.

14. The user equipment according to claim 1, wherein in case of handover said at least one processor is configured to:
receive said radio measurement configuration via a RRC_conn_reconf message.

15. The user equipment according to claim 1, wherein said measurement data includes a signal strength of said first serving cell comprising a received signal power.

16. The user equipment according to claim 1, wherein said measurement data includes a signal quality of said first serving cell.

17. The user equipment according to claim 1, wherein said measurement data includes measurement data related to at least one neighboring cell.

18. The user equipment according to claim 1, wherein said measurement data includes a signal strength or a signal quality of at least one neighboring cell.

19. The user equipment according to claim 1, wherein said radio access network includes an Evolved Universal Terrestrial Radio Access Network.

20. A non-transitory digital storage medium encoding a machine executable program of instructions to perform a method for supporting report of radio measurement information, the method comprising:
establishing a connection to a first radio access node operating a first serving cell,
receiving a radio measurement configuration,
storing measurement data related to a radio measurement performed in accordance with said radio measurement configuration,
detecting a radio link failure or handover failure,
establishing a connection to a second radio access node operating a second serving cell, and
providing said stored measurement data and cell identifier information of said first serving cell towards said second radio access node.

* * * * *